UNITED STATES PATENT OFFICE.

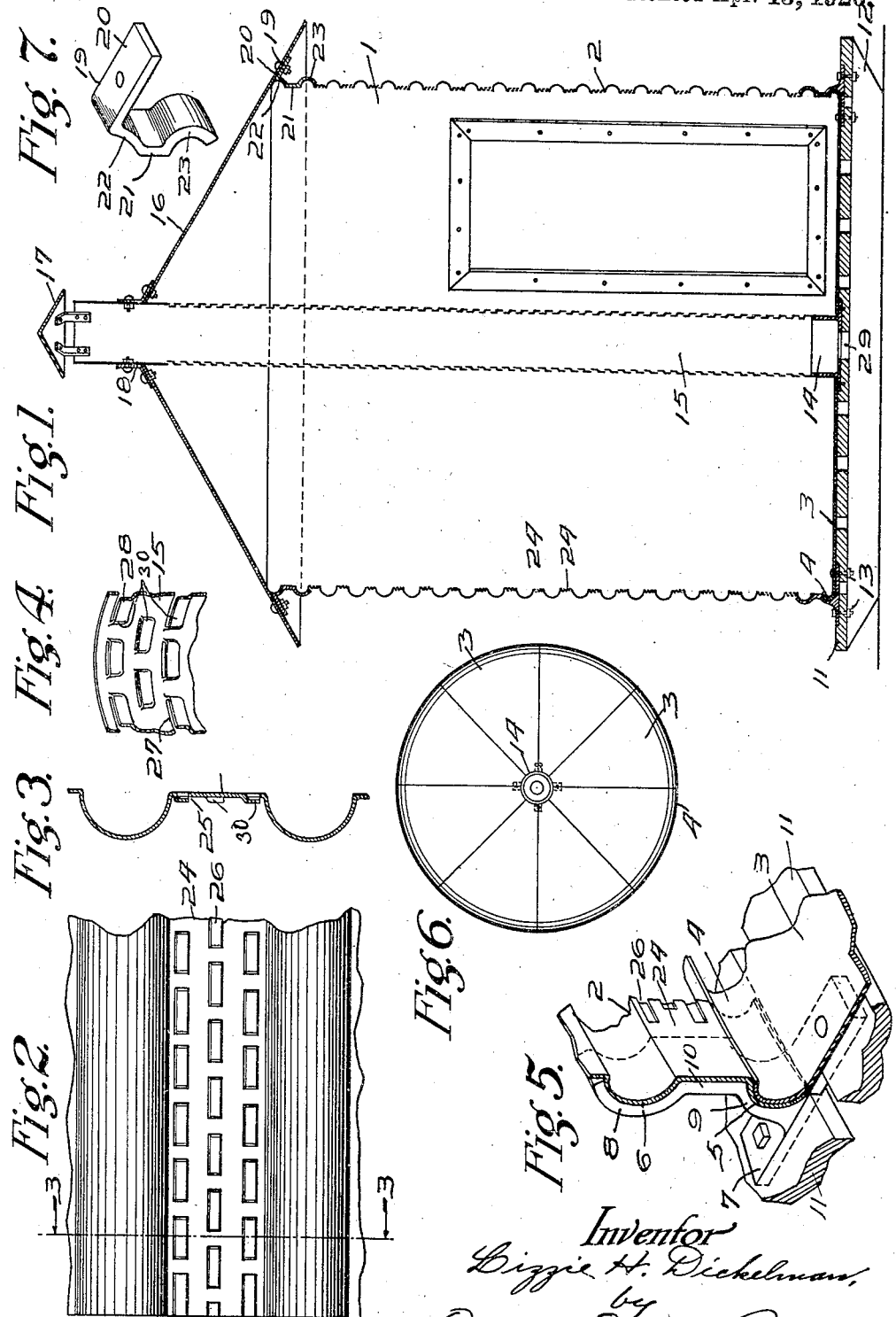

LIZZIE H. DICKELMAN, OF FOREST, OHIO.

GRAIN-STOREHOUSE CONSTRUCTION.

1,336,945.

Specification of Letters Patent.

Patented Apr. 13, 1920.

Application filed October 29, 1919. Serial No. 334,140.

*To all whom it may concern:*

Be it known that I, LIZZIE H. DICKELMAN, a citizen of the United States, and a resident of Forest, in the county of Hardin and State of Ohio, have invented a certain new and useful Grain-Storehouse Construction; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a metal construction wherein farm products may be stored. The particular object of the invention is to provide a metal construction for containing grains which will not only be proof against rodents and mold as well as fire-proof, but also one wherein the smaller grains, such as wheat, rice and oats, and the smaller seeds may be stored, as well as the larger grains, such as corn, and the larger seeds and other farm products may be stored. It also has for its object to provide a construction that will be not only exceedingly strong against any bursting pressure and any compression inward but also one that will provide ample ventilation of the grain or seeds or other farm products that may be stored in the building or bin. It also has for its object to provide a construction which will be water-proof and the ventilating openings will be protected against storms and against contact with any stock that might come in contact with the construction. In constructions containing my invention, the grain may be dumped *en masse* into the bin or storehouse construction, as distinct from putting the same in bags, which has heretofore been used to prevent the escape of, particularly, the smaller grains, such as rice, and notwithstanding the fact that the grain is thus dumped into the bin in any and all conditions of weather molding is prevented, for by my invention is provided a means for thoroughly aerating the grain through openings so constructed that the air will be caught and drawn through the grain. Moreover the construction is such that the plugging of the openings is avoided even by the smaller grains, such as rice and wheat.

My invention thus provides an efficient and durable storehouse or bin for containing farm products of different kinds particularly for containing grains. The building may be placed on a concrete foundation and thus made more or less fixed in character, or the bins may be placed upon skids and moved to the fields and the grain threshed directly into the bins from the threshing machines wherever they may be located. Other features and advantages of my invention will appear upon examination of the drawings and the following description.

The invention may be contained in bins and structures of different forms for containing a large variety of grains and farm products. To illustrate a practical application of my invention I have selected a movable grain bin as an example of other constructions containing my invention and shall describe it hereinafter. The grain bin selected is illustrated in the accompanying drawings.

Figure 1 of the drawings illustrates a sectional view of the grain bin selected. Fig. 2 illustrates an enlarged view of a part of the circular wall of the grain bin to show the details of construction of the wall. Fig. 3 is a sectional view taken on the line 3—3 indicated in Fig. 2. Fig. 4 illustrates a perspective view of a part of the wall of the central shaft for producing aeration of the grain. Fig. 5 illustrates the detail of construction of the lower circular corner portion of the bin whereby the resistance to the bursting pressure due to the weight of the grain is fully sustained. Fig. 6 illustrates a reduced view of the bottom of the grain bin showing the arrangement of the floor sheets of the bin. Fig. 7 illustrates a bracket for securely connecting the side wall with the roof of the grain bin.

1, Fig. 1, is the particular grain bin selected as an example and which is provided with the cylindrical wall 2. The cylindrical wall 2 is preferably made up of a plurality of oblong sheets of metal, the lengths of the sheets being so located that they extend around the bin, their ends and edges being connected together preferably by means of bolts in the manner described in Letters Patent granted to me No. 1,219,267, May 13, 1917. Moreover the sheets are so corrugated that the corrugations extend lengthwise of the sheets whereby the corrugations and the sheets are so placed as to give the greatest strength, obtainable from the sheet metal, to the building. By this arrangement resistance to the bursting pressure due to the weight of the grain is sustained and also any outside compression is withstood.

In the form of the invention illustrated the corrugations of the wall 2 of the grain bin are so formed that a plurality of substantially semi-cylindrical ridges extend outwardly from the bin, and alternate with flat portions of the sheets. The outwardly extending corrugations resist the bursting pressure and any compression brought to bear upon the bin and yet at the same time provide a means for securely interlocking the ends of the sheets and the edges of the sheets that are placed together in constructing the bin. They also provide means for guiding the placement of adjoining sheets that form the wall of the bin. It is to be understood that the corrugations may be V-shaped or square in cross section or they may be of any other suitable shape, but I prefer to use a corrugation of entire metal having a circular cross section and forming a little less than a semi-cylinder. The corrugations, however, extend outward beyond the flat portions, which are provided with ventilating openings, and thus they protect the parts of the bin or building through which the ventilation is accomplished. The corrugation thus not only forms a means of strengthening the construction but also protects the openings from the weather or from cattle and other stock which might otherwise rub against the edges of the openings.

The floor of the bin may be covered with sectors of sheet metal 3 having inwardly and upwardly curved flanges 4 and which, when placed together, form a continuous corrugated flange around the lower circular portion or wall of the bin. The flange 4 fits the interior of the lowermost corrugation 5 of the wall 2. The lower edge of the wall 2 is backed by the arms 6 of the base anchor or brackets 7 disposed in spaced relation around the lower edge of the wall. The arm 6 is provided with a pair of corrugated sections 8 and 9 that fit over the outside of the two lowermost corrugations of the wall 2. The arm 6 is also provided with a flattened portion 10 that fits the intermediate flattened portion located between the two lowermost corrugations of the wall 2. Thus by reason of the fitting of the corrugations of the arm and the wall and also by reason of the fitting of the corrugated flange 4 of the flooring, the wall 2 is securely held in position and the bursting pressure which is maximum near the lower edge of the wall 2 is sustained. The anchors or brackets 7 may be set in concrete if the bin is made stationary or the anchors 7 may be set into the boards 11 that form a part of the framework of the skid 12 and securely held in position by the bolts 13.

The central portion of the floor is provided with a collar 14 which surrounds an opening 29 formed in the boards 11. Rising from the collar 14 in the center of the bin is an air-shaft 15 which extends above the roof 16. It is capped by a suitable cap 17 to prevent the entrance of the rain but which is of such a character as to permit egress of the air curent that is produced in the shaft 15 by reason of the difference in temperature of the air in the shaft 15 and the temperature of the atmosphere surrounding the bin.

The roof 16 is connected to the shaft 15 by a suitable collar 18 and is connected to the wall 2 by means of the brackets 19. Each bracket 19 has a radially extending part 20 which is bolted to the roof 16 and the downwardly extending arm 21 that have corrugated portions 22 and 23 that fit the two uppermost corrugations of the wall 2 and thus securely hold the upper edge of the wall 2 in position relative to the roof 16. The arm 21 has a flat portion that fits the flat portion of the wall located intermediate the two uppermost corrugations. The brackets 19 are disposed in spaced relation around the upper edge of the wall 2. Since the arms 21 fit over the two uppermost corrugations they prevent upward displacement as well as lateral displacement of the roof 16.

Aeration of the grain placed in the bin is accomplished by the formation of openings in the wall 2 of the bin and the shaft 15 which are so located and formed that the rising air will be caught and directed inwardly into the grain and drawn out through the shaft 15 and yet which are so formed that precipitated moisture, either by that produced by rain or by condensation on the outside surface of the wall 2, will not enter the openings formed in the wall 2. Also, the openings are of such a form that the smaller grains, such as rice and wheat, will not plug the openings of either the wall or the shaft. Also the openings in the bin are hooded and thus weather proofed and protected from storm, both rain and snow. Also the openings are so located that they are protected by the corrugations formed in the wall of the bin.

In constructions containing my invention, I have provided a plurality of hooded openings 25, that is, openings that have their upper edges overextending or extending beyond their lower edges. By this arrangement the openings are protected from the weather. The hooded openings may partake of different forms but I preferably produce them by forming oblong embossed or raised portions that extend outward from the wall of the bin. The embossed portions are arranged in horizontal rows and preferably a plurality of rows are placed in proximity to each other. The long axes of the embossed portions are also preferably placed horizontally and they are arranged in staggered relation with respect to the embossed portions of the adjoining rows, that is, the spaces between the embossed portions of one horizontal row may be located beneath or between the centers of the embossed portions of the adjoining row or rows. The embossed or raised portions are located in the flat portions 24 of the metal sheets that form the wall between the corrugations and thus the flat portions of the wall are greatly strengthened by reason of the embossed portions. Also the staggered arrangement of the embossed portions operate to protect the openings since by this arrangement they operate to shed water from the building. They are, moreover, by reason of the corrugations, protected from cattle that may rub against the building. The ventilating openings 25 are hooded by the embossed portions 26, the openings being formed beneath the upper edge of the embossed portion. They are preferably made narrow and located along the lower edge of the embossed portions 26 and thus the openings are from beneath the embossed portions. Therefore the edges of each opening may be said to be in a substantially horizontal plane. By this arrangement each opening is bounded or surrounded by the side walls 30 of the embossments and the surface of the flattened portion 24. Thus each opening is completely protected from a driving rain or from the wash of water down the side of the bin and none will enter into the openings. It will thus be seen that the air rising along the outer side surface of the metal wall, that may be caused by heat produced by the rays of the sun, will readily enter the openings 25 and pass to the interior of the grain bin. The air may also be drawn into the bin and through the grain by the openings 27 which are formed on the upper sides of the embossed portions 28 formed in the shaft 15.

The embossed portions 26 of the wall 2 extend outward while the embossed portions 28 of the shaft 15 project inward and the openings 25 of the wall 2 are located on the under side of the embossed portions 26 while the openings 27 of the shaft 15 are located on the upper side of the embossed portions. By this arrangement the air passing upward through the shaft 15 will draw the air from the grain which will also pass upward through the openings 27.

The embossed portions 26 and 28 are made small and extend away from the grain in the bin to prevent the grain from crowding into the indentations and thus plugging the openings. The slight downward movement of the grain as it settles during the drying operation will cause the grain at all times to be drawn from the openings. Although the shaft 15 has a very much smaller area of surface than the wall 2, yet the openings of the shaft 15 will at all times be free, but because of the large number of embossed portions formed in the wall, there will be substantially the same area for the entrance of the air into the grain that there is for the escape of the air from the grain.

I claim:

1. A metal grain bin formed of a plurality of ventilating building plates, said plates having corrugations formed therein and flat portions located between the corrugations, the flat portions having a plurality of hooded openings formed therein, the said corrugations extending beyond the said hooded portions whereby the hooded openings are protected from weather and contact with animals.

2. A grain bin formed of a plurality of ventilating building plates, said plates having corrugations formed therein, and flat portions located between the corrugations, the corrugations and flat portions extending in horizontal planes, the flat portions having a plurality of embossed portions, the embossed portions having narrow openings formed on the under side, and hooded by the embossed portions, the said corrugations formed of entire metal extending beyond the said embossed portions.

3. A grain bin formed of a plurality of ventilating building plates, said plates having corrugations formed therein and flat portions located between the corrugations, the corrugations formed of entire metal, the corrugations and flat portions extending in horizontal planes, the flat portions having a plurality of rows of oblong embossed portions, the embossed portions having narrow openings formed on the underside hooded by the embossed portions, the embossed portions located in staggered relation as to their centers and as to adjoining rows of the embossed portions.

4. A grain ventilating shaft, having a plurality of rows of oblong embossed portions extending into the shaft, the long axes of the embossed portions extending in horizontal planes, the embossed portions located in staggered relation with respect to their centers and to adjoining rows of the indentations, the embossed portions having narrow openings located in the upper sides of the embossed portions.

5. A grain bin having a wall formed of a plurality of ventilating building plates, said plates having a plurality of embossed portions, the embossed portions having narrow openings formed on the undersides hooded by the embossed portions, and a ventilating shaft having a plurality of embossed portions extending into the shaft, the embossed portions of the shaft having narrow openings formed in the upper sides thereof.

6. A metal grain bin having a base, a ventilating wall, the wall having corrugations located in horizontal planes, and flat portions located intermediate the corrugations, the flat portions having hooded openings formed therein, a ventilating shaft, the shaft having reversed hooded openings, a roof located above the upper edge of the wall, floor plates having upward and inward curved portions fitting the lowermost corrugation of the wall, brackets having arms fitting corrugations and flat portions of the wall and connecting the roof to the wall and the wall to the floor plates and base.

7. A grain bin comprising a wall having corrugations extending in horizontal planes and flat portions located intermediate the corrugations, a supporting floor structure, a plurality of brackets located around the outside of the lower edge of the side wall and having arms fitting the two lowermost corrugations of the side wall and the intermediate flat portion for interlocking the wall with the supporting structure.

8. A grain bin comprising a wall having corrugations extending in horizontal planes and flat portions located intermediate the corrugations, a supporting floor structure, a plurality of floor plates having an upturned corrugation fitting the interior of the lowermost corrugation of the side wall, a plurality of brackets located around the outside of the lower edge of the side wall and having arms fitting the two lowermost corrugations of the side wall and the intermediate flat portions for interlocking the wall with the supporting structure.

9. A grain bin comprising a circular wall having outwardly extending oblong indentations, the indentations having openings located along the lower sides thereof, an airshaft located centrally with respect to the wall and having inwardly extending oblong indentations, the indentations having openings on the upper side thereof, a supporting structure for the wall and the shaft located below the floor of the structure, an opening located in the bottom of the shaft and communicating with the atmosphere exterior of the wall, and an outlet formed in the top of the shaft whereby air may be drawn through grain located within the wall.

In testimony whereof I have hereunto signed my name to this specification.

LIZZIE H. DICKELMAN.